No. 784,281. PATENTED MAR. 7, 1905.
F. SCHACHT.
PNEUMATIC GRAIN ELEVATOR.
APPLICATION FILED FEB. 17, 1903.
2 SHEETS—SHEET 2.
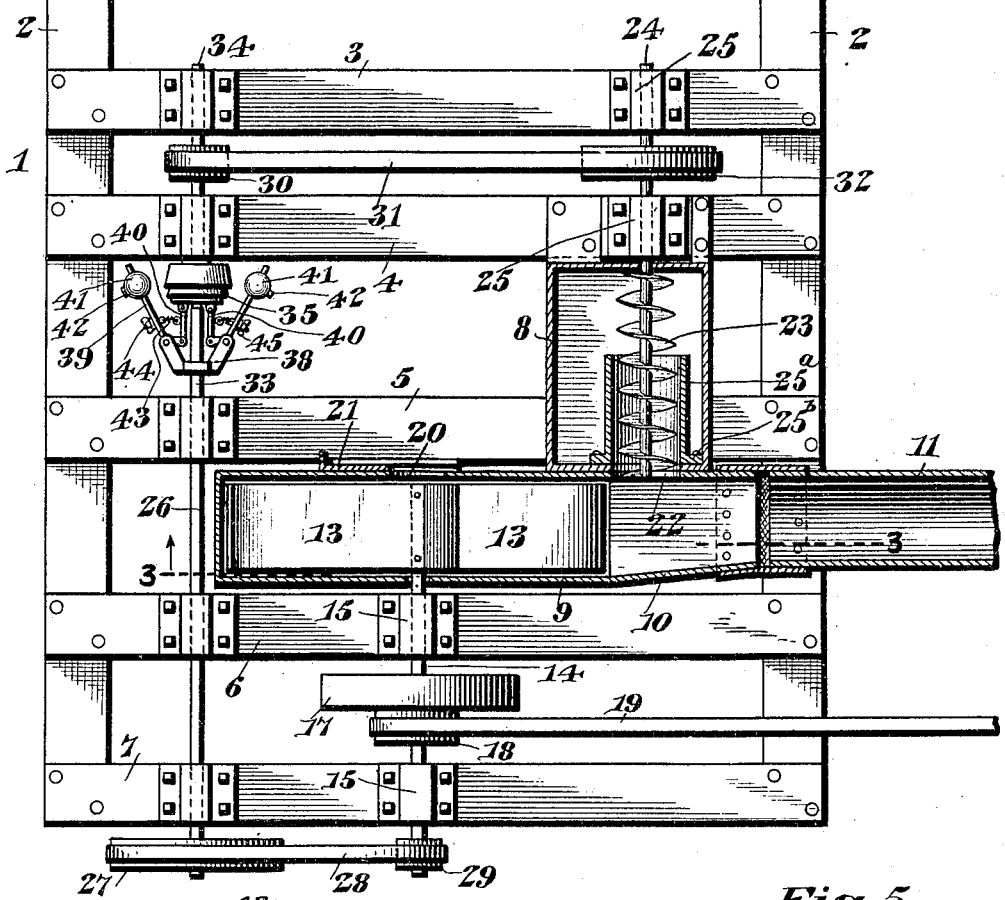
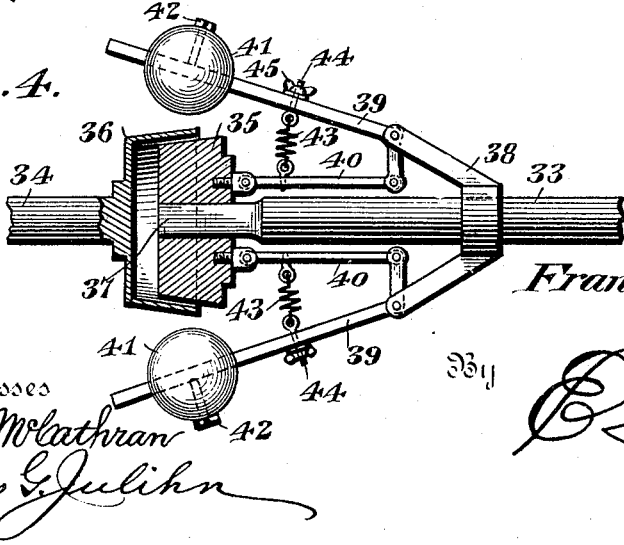
Frank Schacht, Inventor
Witnesses No. 784,281. Patented March 7, 1905.

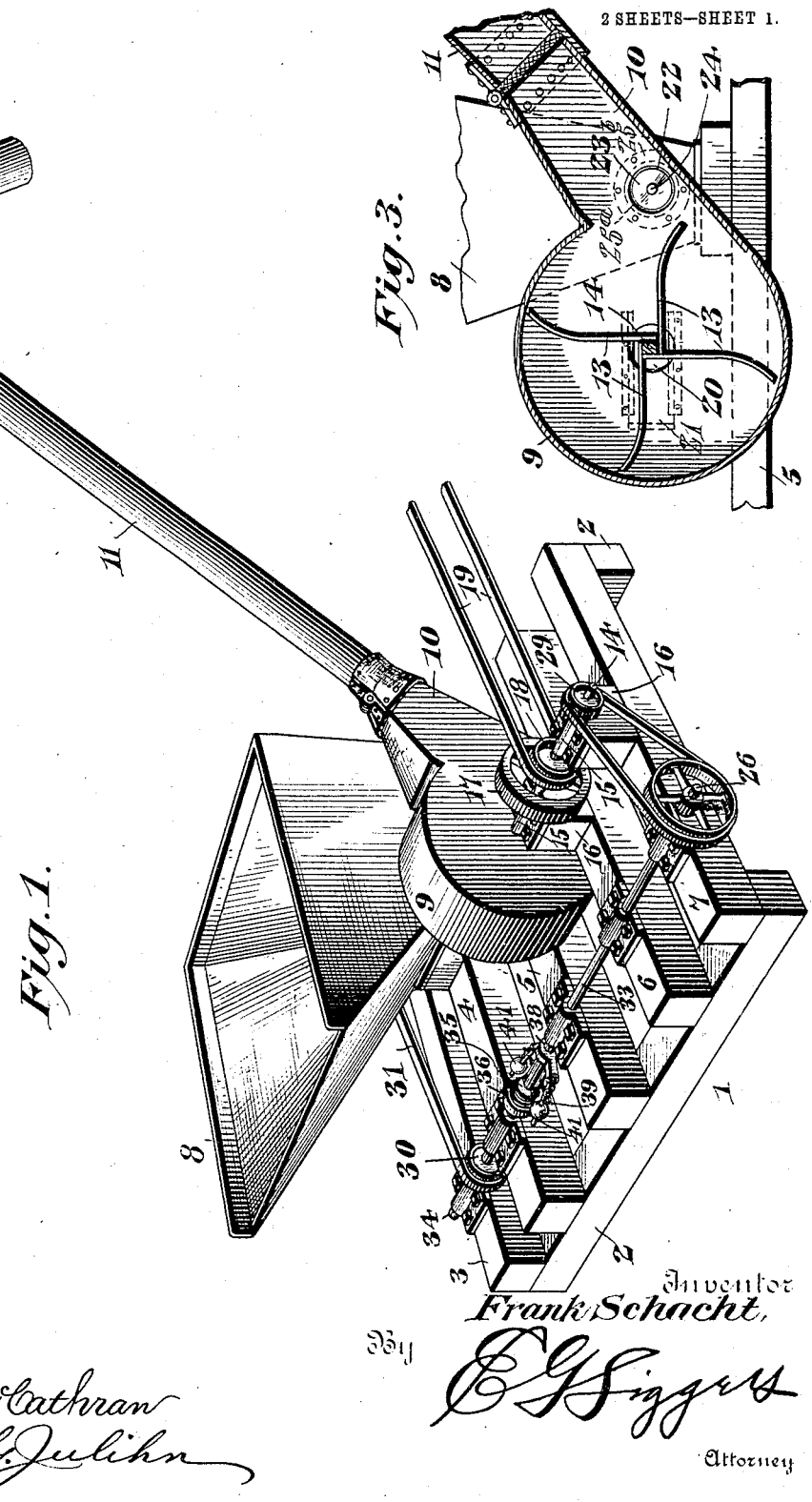

UNITED STATES PATENT OFFICE.

FRANK SCHACHT, OF LIMESPRING, IOWA.

PNEUMATIC GRAIN-ELEVATOR.

SPECIFICATION forming part of Letters Patent No. 784,281, dated March 7, 1905.

Application filed February 17, 1903. Serial No. 143,884.

*To all whom it may concern:*

Be it known that I, FRANK SCHACHT, a citizen of the United States, residing at Limespring, in the county of Howard and State of Iowa, have invented a new and useful Improvement in the Shape of a Blower to Elevate and Move Grain, of which the following is a specification.

This invention relates to improvements in pneumatic grain-elevators, the primary object being to produce a simple and effective apparatus of this character which will require a minimum of power for the elevation of a maximum quantity of grain.

A further object of the invention is to so organize the apparatus that the grain instead of being fed to the center of the fan or blower casing from the hopper in the usual manner will be projected into the casing in the line of blast produced by the fan, but out of the direct range of the fan-blades, to the end that the bruising and breaking of the grain usually incident to the violent contact of the fan therewith will be avoided.

A further object of the invention is to provide automatic means in the line of connection between the fan and the grain-feeding mechanism which will insure the feeding of the grain to the fan-casing when the fan is rotating at a proper rate of speed to effect the elevation of the grain and not otherwise.

A further object of the invention is to provide a spiral feeder within the grain-hopper with a guard-sleeve which will prevent the gravitation of the grain to the interior of the fan-casing while the feeder is at rest.

Subordinate to the objects recited are others, which will more fully appear during the succeeding description of the illustrated structure.

In the accompanying drawings, Figure 1 is a perspective view of my pneumatic grain-elevator complete. Fig. 2 is a sectional plan view thereof. Fig. 3 is a section on the line 3 3 of Fig. 2. Fig. 4 is a detail view, partly in section, of the automatic clutch and governor; and Fig. 5 is a detail perspective view of the guard-sleeve for the feeder.

Like numerals of reference designate corresponding parts in the several views.

Upon a suitable base 1, preferably composed of longitudinal sills 2 and cross-beams 3, 4, 5, 6, and 7, are mounted a hopper 8 and a fan or blower casing 9, the latter having an upwardly-inclined spout 10, to which is hinged a tubular conveyer 11, provided at its discharge end with a hood or elbow 12. The fan-casing 9 is preferably located between the beams 5 and 6, as shown in Fig. 2, and the fan 13, mounted to rotate therein, is carried by a fan-shaft 14, which also constitutes the driving-shaft of the apparatus. The shaft 14 is journaled in bearing-boxes 15, bolted or otherwise secured to blocks 16, carried by the beams 6 and 7, and intermediate of said beams the shaft 14 is provided with a balance or fly wheel 17 and a driving-pulley 18, the latter being geared, as by a belt 19, to a suitable source of power.

At one side of the fan-casing 9 is formed an axial air-inlet opening 20, controlled by a sliding damper or valve 21, by the adjustment of which the quantity of air which may be drawn into the fan-casing by the rotation of the fan is regulated. As the fan 18 is rotated at high speed, the grain is designed to be elevated through the conveyer 11 by the blast thus produced. Ordinarily the grain is drawn into the fan-casing at the axis thereof and is swept around by the blades until caught in the current of air or blast projected through the elevator. This arrangement, however, is objectionable, for the reason that the violent impact of the fan-blades against the grain tends to crack and bruise the latter, and thus deteriorates its value. In accordance with my invention, on the contrary, it is designed to feed the grain to the fan-casing at a point out of the direct range of the fan, but necessarily within the range of the blast, and to provide grain-feeding mechanism which will feed the grain to the casing in determinate quantities in accordance with the speed of the fan and independently of the suction produced thereby. To this end the abutting side walls of the hopper 8 and the casing 9 are pierced to form a feed-opening 22, arranged out of the path of the fan-blades and at a point between the air-opening 20 and the conveyer 11. (See particularly Fig. 3.) Coaxial with the feed-opening and located within the hopper, adjacent to the bottom thereof, is a spiral feeder 23, the shaft 24 of which extends through one wall of the hopper and is journaled in suitable bearings 25, carried by the cross-beams 3 and 4. The feeder is rotated by the application of power to its shaft 24 in a manner to be described and causes the grain within the hopper to be positively fed into the fan-casing through the opening 22, whence it is elevated through the conveyer 11 by the current of air induced by the fan 13. For the purpose of preventing the grain from gravitating to the fan-casing from the hopper through the opening 22 when the feeder is not in operation I provide a guard-sleeve 25$^a$, encircling one end of the feeder and having a terminal flange 25$^b$ bolted to the wall of the hopper concentric with the opening 22.

It will be apparent that the fan must be rotated at high speed to effect the proper elevation of the grain, and it is obvious, therefore, that if the grain is fed to the fan-casing before the latter has attained the required speed it will accumulate and ultimately clog the fan. To avoid this contingency, I have devised mechanism for driving the feeder from the fan-shaft and including means which, while normally permitting the independent rotation of the fan, will automatically connect the fan and feeder when the fan has attained the speed necessary to the effective elevation of the grain.

Journaled in suitable bearings on the base 1 and disposed parallel with the fan and feeder-shafts is a counter-shaft 26, provided upon one end with a comparatively large pulley 27, geared, as by a belt 28, with a comparatively small pulley 29 at one end of the driving or fan shaft 14. At the opposite end of the counter-shaft 26 is keyed or otherwise secured a comparatively small pulley 30, geared, as by a belt 31, to a comparatively large pulley 32 on the feeder-shaft 24. This character of connection between the fan and feeder shafts will be seen to include speed-reducing gearing, since the proportions of the several pulleys will necessarily result in the rotation of the feeder at a much lower speed than that of the fan 13. The counter-shaft 26 is formed in two separate sections 33 and 34, the section 33 being geared to the driving-shaft 14 in the manner stated and the other section, 34, being likewise geared to the feeder-shaft. At the proximate ends of these shaft-sections 33 and 34 are located the members 35 and 36 of a clutch, the member 35 being in the form of a trunco-conical block slidably mounted on the reduced squared end 37 of the shaft-section 33 and disposed to fit tightly within the member 36, which is cup-shaped, as shown. At a point removed from the clutch member 35 the shaft 33 is provided with a fixed yoke 38, to the diametrically-opposed arms of which are pivoted bell-crank levers 39, terminally secured to the clutch member 35 by links 40. The outer arms of the levers 39 are comparatively long and are equipped with adjustable weights 41, designed to be moved toward and from the fulcrums of the levers and retained in their adjusted positions by set-screws 42. The bell-crank levers are designed to be swung by centrifugal force exerted thereon by the weights 41, which will obviously be thrown outwardly by the rotation of the section 33 of the counter-shaft. When the levers are thus swung, the clutch member 35 will be urged into the member 36 and being wedged securely therein will automatically effect the connection of the two shaft-sections 33 and 34, and thus cause the feeder to be driven from the fan-shaft.

In order to determine the exact speed which the fan 13 shall attain before the feeder is put in operation, I provide adjustable means for resisting the outward movement of the weights 41, or, in other words, means for regulating the action of the governor. The illustrated embodiment of the means referred to includes a pair of springs 43, secured at their inner ends to links 40 and at their outer ends to eyebolts 44, passed through the long arms of the bell-crank levers 39 and provided with adjusting-nuts 45, by means of which the bolts 44 may be drawn endwise to adjust the tension of the springs.

Briefly, the operation of my elevator is as follows: The valve 21 having been properly adjusted in accordance with the nature of the grain to be elevated, the fan-shaft 14 is set in motion, and rotary movement is thus imparted to the fan and to the section 33 of the counter-shaft 26. When the fan has reached the proper speed to elevate the grain, the governor-weights will be thrown out by centrifugal force sufficiently to move the clutch member 35 into close frictional engagement with the member 36. As the section 33 of the counter-shaft continues to rotate motion will be imparted to section 34 of said shaft, and by reason of the intermediate gearing the feeder 23 will be rotated. As the spiral feeder revolves the grain will be fed from the hopper to the interior of the fan-casing at a point between the fan and the conveyer and being caught by the blast of air induced by the fan will be elevated through the conveyer and deposited at the desired point. If for any reason the speed of the fan should be reduced sufficiently to impair the effective elevation of the grain, the speed of rotation of the counter-shaft will be likewise reduced and the governor-weights will move in, thus disengaging the clutch members and automatically breaking the connection between the fan-shaft and the feeder to stop the feeding of the grain to the fan-casing.

It is thought that from the foregoing the construction, operation, and many advantages of my elevator will be clearly apparent; but while at this time the present embodiment of the invention is thought to be preferable I desire to reserve the right to effect such changes, modifications, and variations of the illustrated structure as may fall fairly within the scope of the protection prayed.

What I claim is—

1. In a pneumatic elevator, the combination with a fan-casing and a hopper arranged side by side, of a fan within the casing, said casing having an opening in a side wall thereof to supply air to the fan, and having a second opening in a side wall thereof, beyond the periphery of the fan, and arranged to establish communication between the hopper and the fan-casing, and means for feeding grain to the interior of the fan-casing through the last-named opening.

2. In a pneumatic elevator, the combination with a fan-casing having an axial opening and a spout; of a rotary fan within the casing, and means for directing grain through a vertical side wall of the fan-casing at a point between said opening and the discharge end of the spout.

3. In a pneumatic elevator, the combination with a fan-casing having an axial opening and a spout; of a rotary fan within the casing, and means for directing grain to the fan-casing at a point between said opening and the discharge end of the spout, beyond the periphery of the fan and adjacent to the bottom wall of the casing.

4. In a pneumatic elevator, the combination with a fan-casing having an axial opening, and a valve controlling the same; of a rotary fan within the casing, and a hopper communicating with the fan-casing at one side thereof and at a point beyond the periphery of the fan.

5. In a pneumatic elevator, the combination with a fan-casing having an axial opening and a discharge-spout; of a rotary fan within the casing, a hopper communicating with the fan-casing at a point between the axial opening thereof and the discharge end of the spout, a spiral feeder located in the hopper to feed the grain horizontally to the fan-casing, and means for operating the fan and feeder.

6. In a pneumatic elevator, the combination with a fan-casing, and a rotary fan therein; of a hopper communicating with the interior of the fan-casing through a feed-opening, a spiral feeder located in the hopper, and a guard-sleeve inclosing the end of the feeder adjacent to the feed-opening.

7. In a pneumatic elevator, the combination with the fan-casing, a rotary fan therein, and a hopper communicating with the interior of the fan-casing beyond the periphery of the fan; of a feeder within the hopper, and connecting means intermediate of the fan and feeder, said means including a device for automatically connecting the fan and feeder when the fan has reached a predetermined speed.

8. In a pneumatic elevator, the combination with a fan-casing having an axial opening and a discharge-spout; of a rotary fan in the casing, a hopper communicating with the fan-casing at a point beyond the periphery of the fan, a spiral feeder in the hopper, and connecting mechanism intermediate of the fan and feeder, said mechanism including speed-reducing gearing and a centrifugally-operated clutch arranged to effect an operative connection between the fan and feeder when the fan is rotated at a given speed.

In testimony whereof I have signed my name to this specification in the presence of two subscribing witnesses.

FRANK SCHACHT.

Witnesses:
F. M. CLARK,
F. W. CLARK.